March 23, 1926. 1,577,970

H. L. HOSTERMAN

INTERNAL COMBUSTION ENGINE

Filed Jan. 2, 1923 4 Sheets-Sheet 1

Inventor
Harry L. Hosterman

By F. E. Shannon
Attorney

Inventor
Harry L. Hosterman
By F.E. Shannon
Attorney

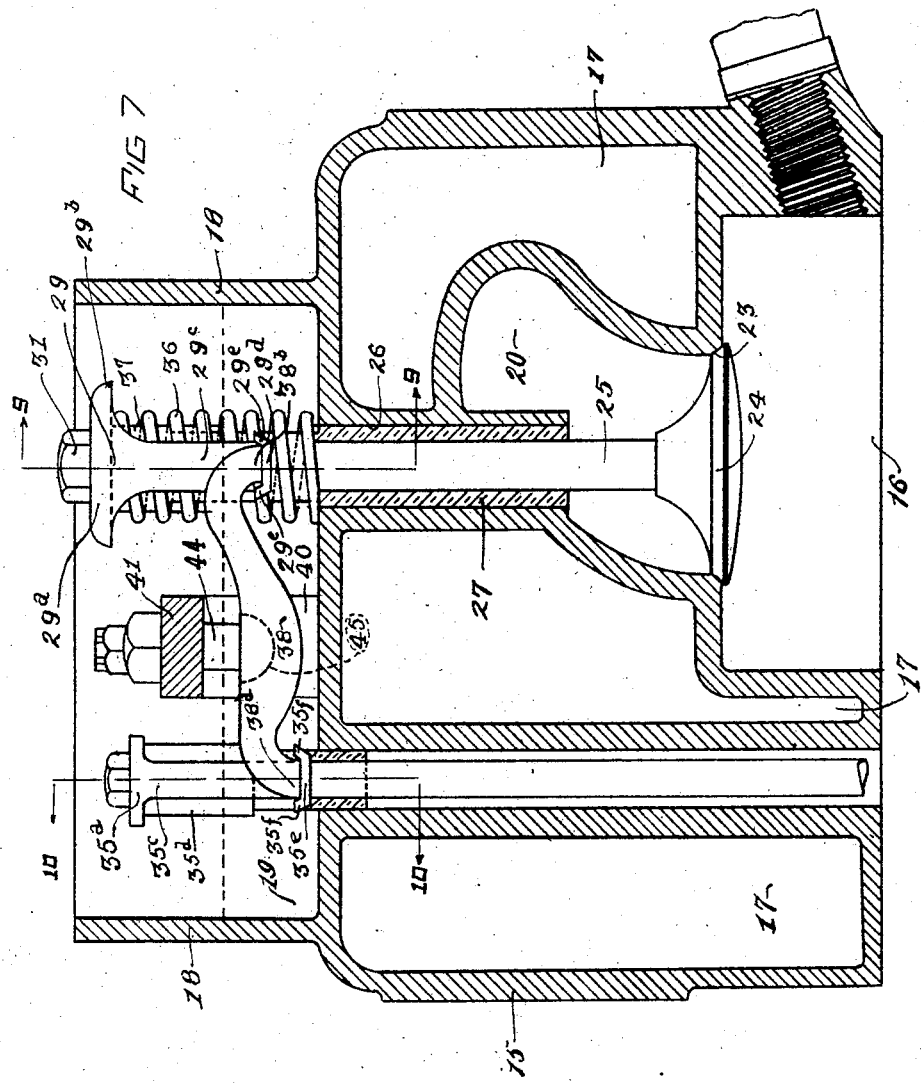

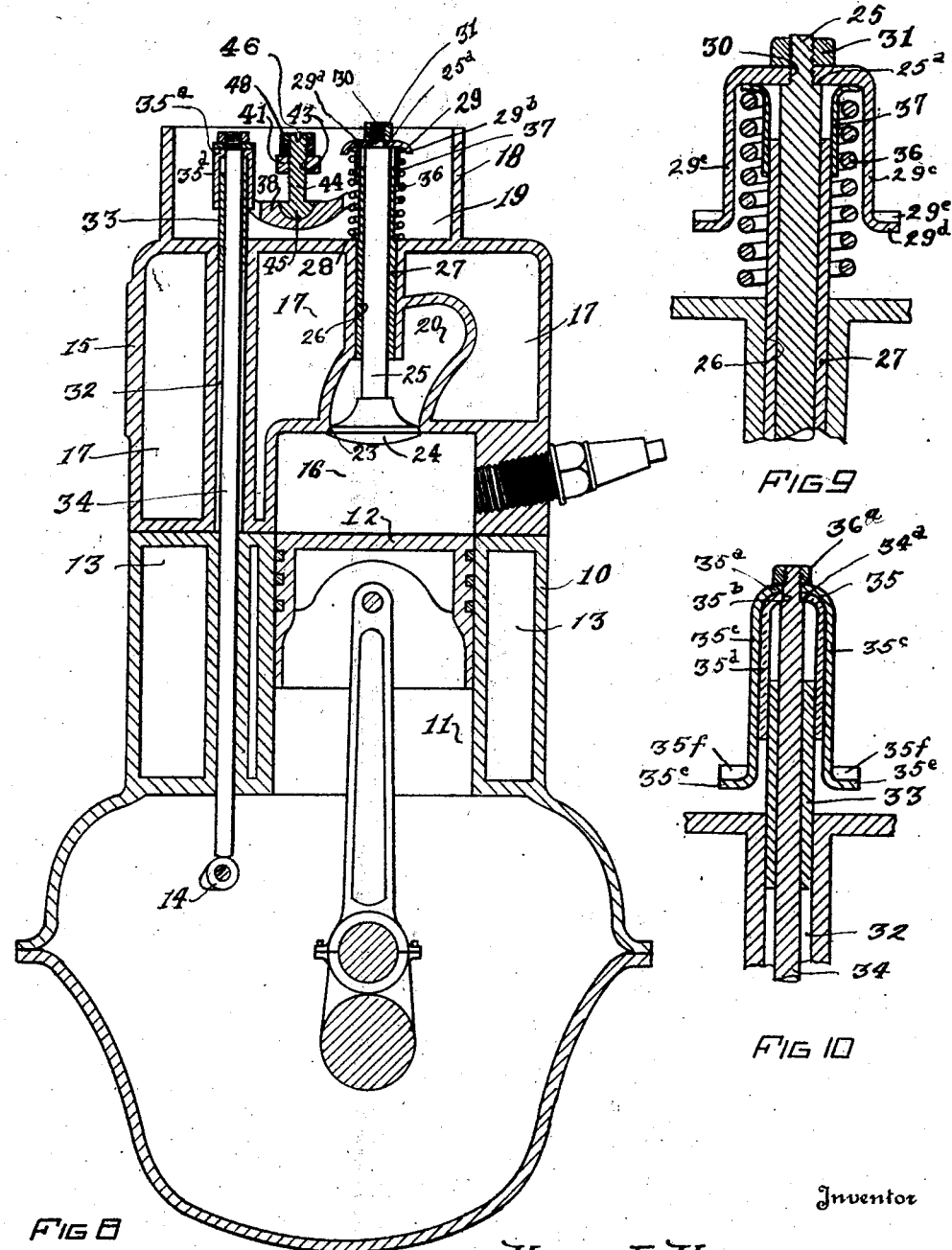

Patented Mar. 23, 1926.

1,577,970

UNITED STATES PATENT OFFICE.

HARRY L. HOSTERMAN, OF AKRON, OHIO, ASSIGNOR TO THE AKRON MOTOR & MANUFACTURING COMPANY, OF AKRON, OHIO, A CORPORATION OF OHIO.

INTERNAL-COMBUSTION ENGINE.

Application filed January 2, 1923. Serial No. 610,128.

*To all whom it may concern:*

Be it known that I, HARRY L. HOSTERMAN, a citizen of the United States, residing at Akron, in the county of Summit and State of Ohio, have invented new and useful Improvements in Internal-Combustion Engines, of which the following is a specification.

This invention relates to new and useful improvements in internal combustion engines and has particular relation to a novel and improved overhead valve mechanism for such engines.

Objects of the invention are to provide an engine head of simple, durable, relatively inexpensive construction having novel and efficient overhead valve mechanism and which will be adapted for use on practically every type of engine constructed with a removable head.

A particular object of the invention is to provide an engine having an overhead construction in which the working parts of the valve mechanism are submerged in oil and to thereby provide a quiet running valve construction having highly efficient means of lubrication.

A further object is to provide an engine having an oil reservoir in which the cooperating parts of the valve mechanism are located and to provide detachable closure means for said reservoir whereby the valve mechanism may be readily accessible and whereby a quantity of oil may be retained therein and dust and other objectionable matter excluded therefrom.

A still further object is to provide an internal combustion engine having an oil chamber with the valve mechanism located therein and having means whereby the push rods and valve rods may be operated without loss of oil.

An additional object is to provide an oil reservoir of the type above indicated and to provide a partition therefor whereby the level of the oil will not be materially varied while operating the engine on an incline.

Other objects are to provide an overhead valve mechanism having simple, durable, extremely efficient rocker arms of new and improved construction; to provide practical, novel, readily adjusted means for fulcruming said arm and to provide push rod and valve rod saddles of improved construction which may be manufactured at a low cost and which in use will provide means whereby a movement of the push rod will impart an opposite movement to the valve rod with a minimum amount of friction and with no appreciable loss of motion.

The above objects are accomplished and additional ends are attained by the novel construction, combination and arrangement of parts hereinafter described and illustrated in the accompanying drawings wherein I have shown a preferred embodiment of the invention, it being understood that the invention is capable of various adaptations and that changes, variations and modifications may be made or substitutions resorted to which come within the scope of the claims hereunto appended.

In the drawings which form a part of this specification, similar characters of reference are employed to designate like or similar parts as the same may be shown in any of the several views and in which:—

Figure 7 is a vertical, cross sectional view of my improved engine head taken as indicated by the lines 7—7 of Figure 5.

Figure 8 is a vertical, cross sectional view of an engine constructed in accordance with this invention, the same being taken as indicated by the lines 8—8 of Figure 5.

Figure 9 is a central, vertical, sectional view of the valve saddle showing the same operatively connected to the valve rod and taken as indicated by the lines 9—9 of Figure 7.

Figure 10 is a central, vertical, sectional view of the push rod saddle employed in carrying out this invention, the same being disclosed as operably attached to the push rod, and taken as indicated by the lines 10—10 of Figure 7.

Figure 1:
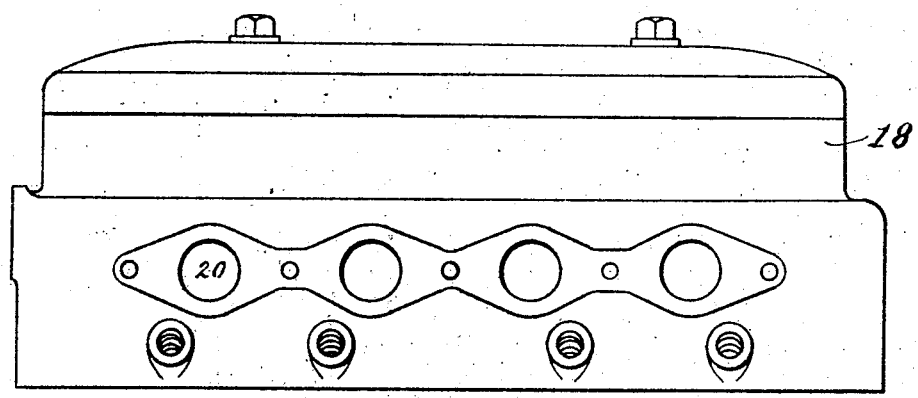
Figure 1 is a side elevational view of an engine head constructed in accordance with this invention, showing the same with the lid in place.
Figures 2, 4:
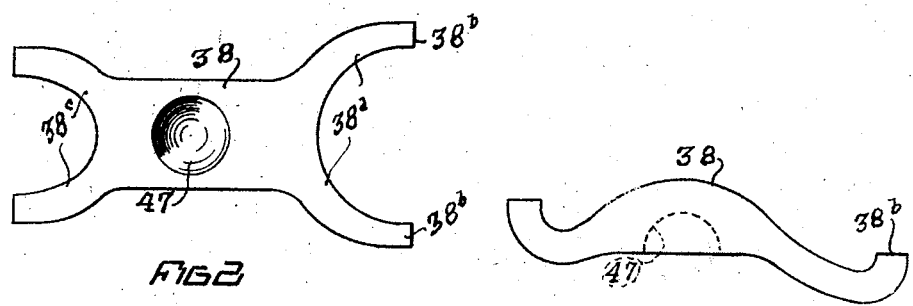
Figure 2 is a bottom plan view of the new and novel rocker arm used in carrying out this invention.
Figure 4 is a side elevational view of the improved rocker arm employed in carrying out this invention.
Figure 3:
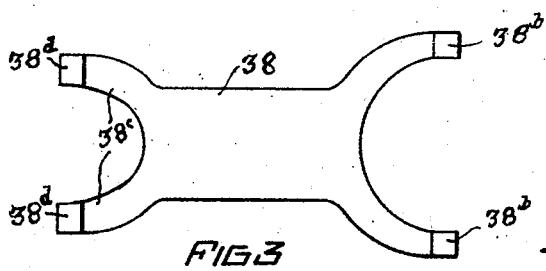
Figure 3 is a top view of same.
Figure 5:
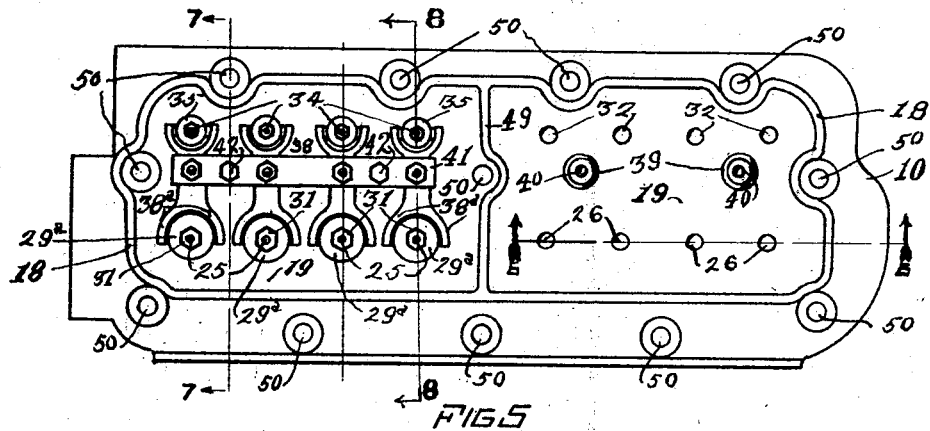
Figure 5 is a top plan view of an internal combustion engine constructed in accordance with this invention having the lid removed to more clearly disclose the valve mechanism employed.
Figure 6:
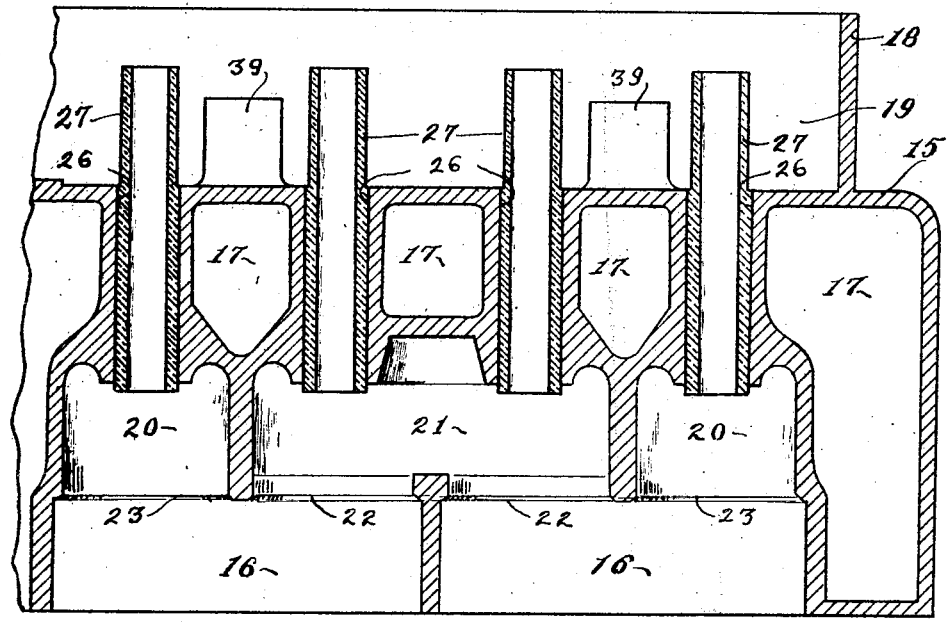
Figure 6 is a fragmentary, vertical, sectional view taken as indicated by the lines 6—6 of Figure 5.

Proceeding now to a detailed description of the invention with reference to the particular embodiment thereof disclosed in the drawings, the numeral 10 denotes an explosive engine, the numeral 11 the cylinder and the numeral 12 the pistons operating in said cylinders. The numeral 15 is used generally to denote the engine head and the numeral 16 is used to denote a plurality of explosion chambers which project into the head 15 from the lower face thereof. The chambers 16 are preferably formed to correspond in size and shape to the cylinders in the engine and the said chambers 16 are arranged in the head 15 in alinement with the similar chambers 11 in the engine. The head 15 is provided with a water cavity 17 which extends as far as is practical around the explosion chamber 16. The said cavity forming openings in the lower face of the head 15 which are arranged to communicate with the water cavity 13 of the engine cylinder and permit a free circulation of water through the cavity 17. The head 15 is provided on the upper side thereof with a vertical flange 18 which extends therearound in spaced relation to the outer edge thereof and forms a valve chamber and oil reservoir 19. In addition to the water cavity 17, the head is provided with the usual exhaust cavity 20 and intake cavity 21 branches from each of said cavities leading to points above each of said explosion chambers 16. The upper wall of each explosion chamber 16 is provided with the port 22 which communicates with an exhaust cavity 20 and with the port 22 which communicates with the intake cavity 21. A valve 24 is seated in the port 22 so as to control the flow of an explosive mixture to the explosion chamber 16 and a like valve 24 is seated in each exhaust port 23 and controls the flow of exhaust gases therethrough.

Each valve 24 is provided with a valve stem 25 which extends upwardly through a bore 26 which extends upwardly through the head 15. A valve bushing 27 is fitted in each bore 26 so as to extend longitudinally thereof. The bushing 27 projects upwardly into the chamber 19 for a purpose to be hereinafter described.

Each valve stem 25 has secured to the upper end thereof, a saddle member 29. In the adaptation of the invention shown, the rod is reduced in diameter adjacent the upper end thereof to form the shoulder $25^a$ and the reduced portion of said stem is positioned in the opening 30 in the saddle member 29 which is secured in place against the shoulder by means of the nut 31 which is operated on suitable screw threads formed on the said reduced portion.

The valve rod saddle 29 is similar to the push rod saddle 35, but is somewhat larger provision being made for the spring 36 designed to normally hold the valve 24 in a closed position. The saddle member 29 is provided with a flat top portion $29^a$ which is preferably circular and is provided around the outer edge thereof with a downwardly protruding flange $29^b$ which forms a seat for the upper end of the spring 36. The numeral 37 denotes a tubular member which is similar to the tube $35^b$ and serves a similar purpose, it being positioned on the upwardly projecting end of the bushing 26. The tube 37 is provided with an outwardly projecting annular flange which is adapted to be positioned over the spring 36 which holds the said tubular member 37 in close contact with the top portion $29^a$. The top portion $29^a$ is provided with the arms $29^c$ which are similar to the arms $35^a$ and project downwardly from opposite sides of said top member to a point in spaced relation to the bottom of the reservoir 19. The arms $29^c$ are provided at the lower end thereof with a horizontal portion $29^d$; which portion $29^d$ is provided on each lateral side thereof with an upwardly projecting flange $29^e$ which serves to retain the ends of the rocker member 38 in position on the horizontal portion $29^d$.

The numeral 32 denotes vertical bores which project through the engine head 15 and extend into the engine block 10 at points directly above the cam 14. One of said bores extends in parallel spaced relation to each bore 26. Each bore 32 is provided at the upper end thereof with a push rod bushing 33 or tube which is inserted in said bore. The push rod bushing or tube 33 projects upwardly from the bottom of the valve chamber 19 to a point approximately level with the upper end of the bushing 27. A push rod 34 is mounted in each bore 32 so as to operatively contact with the cam 14. Each push rod 34 projects upwardly to a point above the upper end of the bushing 33 in which it is mounted and is provided at the upper end thereof with the member 35 which for the purpose of this description will be hereinafter termed a push rod saddle. Each push rod saddle member 35 includes a flat top portion $35^a$ adapted to be secured to the upper end of the rod 34. In the adaptation of the invention shown the rod 34 is reduced in diameter adjacent the upper end thereof to provide a shoulder $34^a$ and the reduced portion is provided with screw threads. A flat top portion $35^a$ which is preferably circular and is provided with a centrally positioned bore $35^b$ adapted to receive said reduced portion is fitted in the said bore.

The numeral 36ª denotes a nut which is threaded on the said reduced portion and operated against the flat portion 35ª to hold it firmly against the shoulder 34ª. Each portion 35ª is provided with a pair of arms 35ᶜ which project downwardly from diametrically opposite edges thereof. The arms 35ᶜ are preferably arcuate in cross sectional form and are concentrically arranged in respect to the rod 34. Each member 35 is provided with a tube 35ᵈ which is impinged between the arms 35ᶜ with the upper end thereof fitted snugly against the top portion 35ª. The tube 35ᵈ is adapted to snugly receive the upwardly projecting end of the push rod bushing 33 and is of sufficient length to extend below the top of the bushing 33 when the push rod 34 is in an upward position. Each arm 35ᶜ extends downwardly below the tube 35ᵈ and to a point in spaced relation to the bottom of the oil reservoir 19. Each arm 35ᶜ is provided at the lower end thereof with an outwardly projecting horizontal portion 35ᵉ which is adapted to receive the fork ends of the rocker arm 38 hereinafter described. Each horizontal portion 35ᵉ is provided, on each lateral side thereof, with an upwardly projecting flange 35ᶠ which forms a seat adapted to retain the prongs of the rocker arm 38 in position on the horizontal portion 35ᵉ as hereinafter described.

It will thus be seen that the valve stem bores 26 are arranged in a straight row running centrally of the explosion chambers 16 and that the same project into the valve chamber 19 at points adjacent one side of said chamber. It will also be seen that the push rod bores are arranged in a row running parallel to the valve stem bores 26 and that a valve stem bore 32 is arranged opposite each push rod bore at a point adjacent the other side of the chamber 19.

The numeral 39 denotes integrally formed upwardly projecting bosses which are positioned in a row arranged between the rows of valve stem bores and push rod bores. In the adaptation of the invention shown each boss is cylindrical and is provided with a flat top. Each boss 39 is provided with a threaded bore 40 which projects coaxially therein from the upper end thereof. The numeral 41 denotes a bar which is positioned on two or more of said bosses 39 and is secured thereto in spaced relation to the bottom thereof by means of the bolts 42 which are positioned through suitable bores in said bar and are threaded in the bores 40. Each bar 41 is provided at points between the opposite valve and push rod stems with a threaded vertical bore 43 and a bolt 44 having a semi-spherical head 45 is fitted therein from the lower side thereof. Each bolt 44 is provided on the upper end thereof with a slot 46 adapted to receive a screw driver blade for the purpose of adjusting it in the bore 43. The numeral 38 denotes a rocker arm constructed in accordance with this invention. The rocker arm 38 is provided at each end thereof with a pair of prongs 38ª and 38ᶜ. The prongs 38ª at one end of the rocker arm 38 project upwardly and outwardly and each prong terminates in a downwardly protruding portion 38ᵇ which is adapted to seat between the flanges 29ᵇ on the horizontal portion 29ᵈ of the saddle member 29. Each rocker arm 38 is also provided on the other end thereof with a similar, but relatively smaller, pair of forks 38ᶜ which project outwardly from the body of the rocker arm 38 and are provided with the downwardly protruding portions 38ᵈ adapted to seat on the horizontal portions 35ª and between the flanges 35ᶠ on the saddle member 35. The central portion of each rocker arm 38 is preferably provided with a flat upper face and with a downwardly protruding lower face and is further provided on the upper side thereof with a semi-spherical seat 47 which is adapted to receive the head 45 of the bolt 44. With the forks 38ª thus positioned on the valve rod saddle 29 and the forks 38ᶜ positioned on the valve rod saddle 35, the bolt 44 is operated to position the head 45 thereof firmly in the seat 47 and the nut 48 is operated on the bolt 44 to lock the same firmly in place. In the adaptation of the invention shown the seat 47 is positioned at a point relatively nearer to the push rod stem so that an upward movement of the push rod will cause a substantially longer, longitudinal movement of the valve rod stem. The chamber 19 is provided with a partition 49 which is preferably an integral part of the engine head 15 and extends transversely thereof between the flanges 18 for the purpose of preventing oil when the same is placed in said valve chamber 19 from accumulating at one end of the chamber when the engine is operated on an incline.

In practice, the head 15 is positioned on the engine 10 and is secured in place in the usual manner by means of the bolts 50 with each of the rods 34 positioned on the cam shaft 14. Oil is then placed in the valve chamber or oil reservoir 19 until the level thereof is a short distance below the upper end of the bushings 27 and 33. While any desired quantity of oil may be placed in the chamber 19 I prefer to use a quantity sufficient to cover the bolt head 45, and the prongs 38ᵇ and 38ᵈ. A lid 51 is then placed on the flange 18 to close the valve chamber 19, thus preventing a loss of oil by splashing and excluding dust and other objectionable matter therefrom.

It will thus be seen that all working parts of the valve mechanism herein described are positioned in oil and that I have provided highly efficient, practical means whereby the valves may be operated with a minimum amount of noise and with a minimum amount of wear.

Particular attention is called to the tubes 35$^b$ which telescope with the bushings 33 and to the tubes 37 which telescope with the bushing 27, the same being arranged to permit a free longitudinal movement of the push rods and valve heads without loss of oil from the reservoir 19.

While I have shown my invention as applied to an engine having a removable head it is obvious that it may be applied to an engine having a head portion integral with the main body of the engine and while I have shown a multiple cylinder engine cast in one block, it is to be understood that the invention may be applied to engines having separate cylinders or separate blocks of cylinders and that each cylinder may be provided with a reservoir 19 in which the valve mechanism may be located.

Having thus illustrated my invention and described the same in detail what I claim as new and desire to secure by Letters Patent is:—

1. In an internal combustion engine, an oil reservoir on the top thereof push rods and valve rods leading to said reservoir, said rods provided with bushings which are fitted in said engine and project upwardly from the bottom of said reservoir; a tube closed at the upper end concentrically arranged around each rod so as to be movable therewith, each tube arranged to telescope with one of said bushings.

2. In an internal combustion engine, an oil reservoir associated with the head thereof, a valve operating rod leading to said reservoir, a tube which projects upwardly from the bottom of said reservoir, said rod mounted in said tube and a tube associated with said rod, the last named tube telescoping with the first named tube for the purpose herein described.

3. In an engine having overhead valves, a valve rod projecting upwardly from said engine, a rocker arm saddle secured to the upper end of said rod, said saddle including a top portion having arms leading downwardly from diametrically opposite sides thereof, a spring mounted around said rods and compressed between said top portion and the engine and a rocker arm seat on the downwardly projecting end of each arm.

4. In an engine, an explosion chamber, intake and exhaust ports communicating therewith, valves controlling said ports, a chamber on the top of said engine, said chamber adapted to contain oil, valve rods and push rods projecting into said chamber; a rocker arm fulcrumed in said chamber with its opposite ends operatively connected to said rods, the engine provided with tubes fitted around each of said rods, and projecting into said chamber, a sleeve on each rod, each sleeve telescoping with one of said tubes and arranged to permit a free reciprocatory movement to said rods without loss of oil from said chamber.

5. In an engine, an explosion chamber, intake and exhaust ports communicating therewith, valves controlling said ports, an oil reservoir in the top of said engine, said reservoir adapted to contain oil; valve rods and push rods projecting into said reservoir; tubular portions extending upwardly over said engine into said chamber, said rods mounted in said tubular portions; a sleeve on each rod telescoping with one of said tubular portions, a rocker arm saddle on each rod, each saddle having arms extending below the top of said tubular portions, the lower end of each arm provided with a rocker arm seat, a rocker arm operatively connecting each valve rod saddle with a push rod saddle, said rocker arm fulcrumed in said chamber at a point below the upper end of said tubular portions.

6. In an engine, a head having an oil reservoir in the top thereof, said head provided with push rod bores which extend upwardly to said reservoir, a tube fitted in said bore so as to project into said reservoir, a push rod mounted in each tube, a saddle mounted on the upper end of each push rod, said saddle including arms which project downwardly from opposite sides of said rod in spaced relation thereto, a sleeve impinged between said arms, said sleeve telescoping with one of said tubes.

7. In an engine head, an oil reservoir associated with the top thereof, said engine provided with push rod bores extending upwardly to said reservoir, a head provided with a tube which projects upwardly from the bottom of said reservoir around each of said bores, a push rod mounted in each tube, a saddle secured to the upper end of each push rod, said saddle including arms which project downwardly from opposite sides of said rod in spaced relation thereto, a rocker arm seat on the lower end of each arm and a tubular portion extending downwardly between said arms with said tube mounted therein.

8. An engine having an oil reservoir in the top thereof, said engine provided with push rod and valve rod bores which extend upwardly to said reservoir, a tube fitted in each bore so as to project into said reservoir, a rod mounted in each tube, a saddle mounted on the upper end of each rod, said saddle including a flat top portion; arms which project downwardly from opposite sides of said top portion in spaced, parallel relation to said rod, a sleeve projecting downwardly from said top portion and extending between said arms to a point in spaced relation above the bottom thereof, a rocker arm seat on the bottom of each arm, each sleeve telescoping with one of said tubes.

9. In an engine, an oil reservoir associated with the top thereof, said engine provided with push rod and valve rod bores extending upwardly to said reservoir, a tube projecting upwardly into said reservoir from each of said bores, a push rod mounted in each tube, a saddle secured to the upper end of each push rod, said saddle including arms which project downwardly from opposite sides of said rod in spaced relation thereto, a horizontal portion on the lower end of each arm, a flange on each horizontal portion, a tubular portion extending downwardly between said arms, said tubular portion telescoping with one of said tubes, bosses projecting upwardly from the bottom of said reservoir, a bar mounted on said bosses, threaded bores in said bar, a bolt threaded in each bore, a rocker arm fulcrumed on said bolt and provided on each end thereof with a pair of diverging prongs, each prong terminating in a downwardly protruding end adapted to seat on the horizontal portion on one of said arms.

10. In an engine, a reservoir associated with the top thereof, overhead valve mechanism located in said reservoir, push rods and valve rods leading to said reservoir, a bushing fitted around each push rod, each bushing projecting upwardly into said reservoir, a rocker arm saddle on the top of each rod, each saddle having a sleeve adapted to receive one of said bushings, arms projecting downwardly from opposite sides of each sleeve to points below the bottom thereof, each arm provided at the bottom thereof with a seat adapted to receive the end of a rocker arm, a rocker arm fulcrumed in said reservoir, each rocker arm provided at each end thereof with a pair of prongs adapted to be received in said seats.

11. In an engine, a reservoir associated with the top thereof, overhead valve mechanism located in said reservoir, push rods and valve rods leading to said reservoir, a bushing fitted around each push rod, each bushing projecting upwardly into said reservoir, supports projecting upwardly from the bottom of said reservoir, a bar mounted on said supports so as to extend longitudinally of said reservoir, threaded bores in said bar, a bolt having a head provided on the underside thereof with a spherical surface, one of said bolts entered in each of said bores from the under side thereof, a rocker arm provided on the upper face thereof with a semi-spherical seat adapted to receive said bolt head prongs on each end of said rocker arm, a rocker arm saddle on the top of each push rod, each saddle having a sleeve adapted to receive one of said bushings, arms projecting downwardly from opposite sides of each sleeve to points below the bottom thereof, each arm provided at the bottom thereof with a seat adapted to receive one of said prongs.

In testimony whereof I have hereunto set my hand.

HARRY L. HOSTERMAN.